Oct. 24, 1961 P. REITZAMMER 3,005,281
TROT LINE CONTAINER AND DISPENSER
Filed June 10, 1960 2 Sheets-Sheet 1
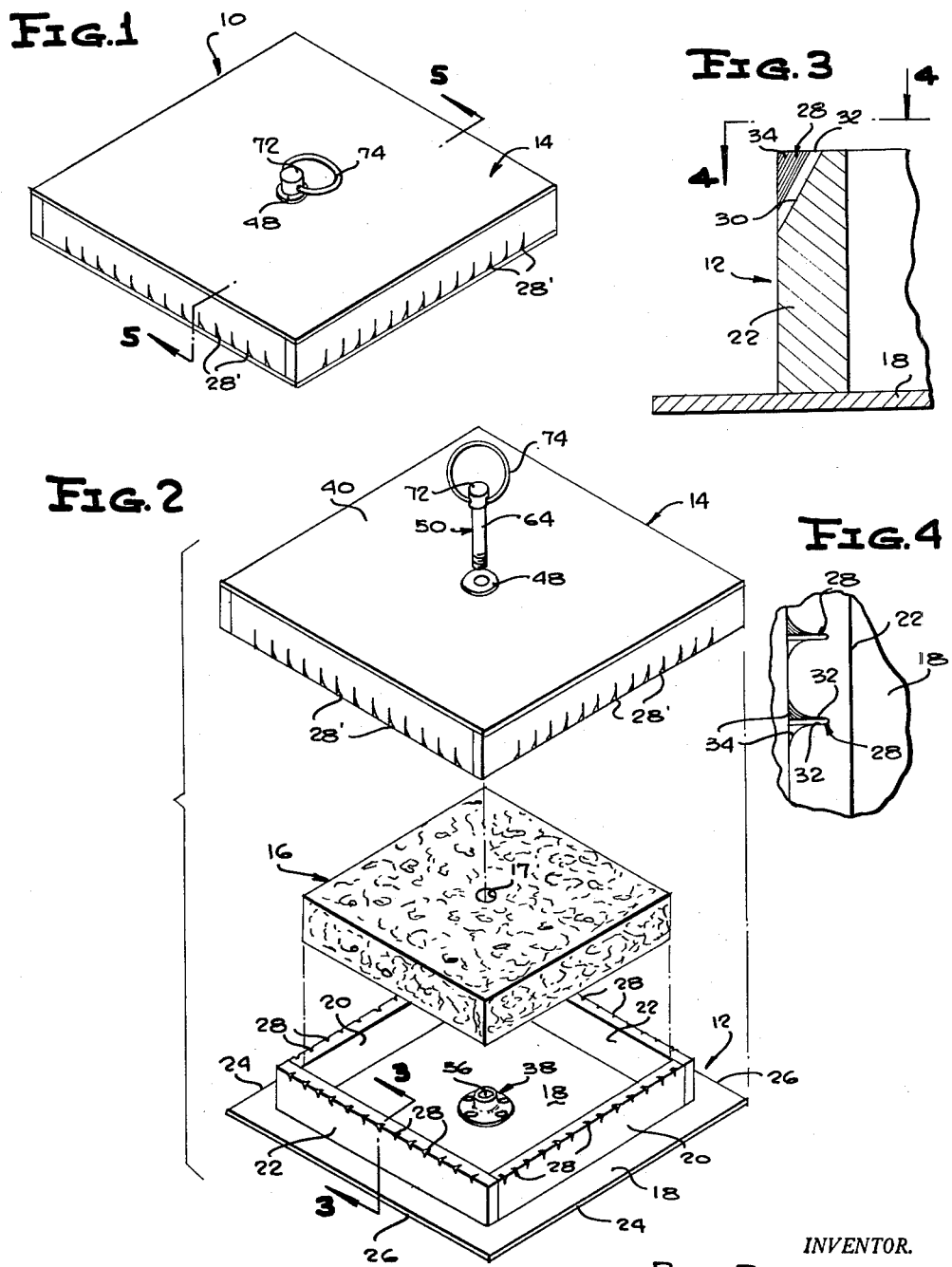
INVENTOR.
PAUL REITZAMMER
BY
McMorrow, Berman + Davidson
ATTORNEYS Oct. 24, 1961  P. REITZAMMER  3,005,281
TROT LINE CONTAINER AND DISPENSER
Filed June 10, 1960  2 Sheets-Sheet 2
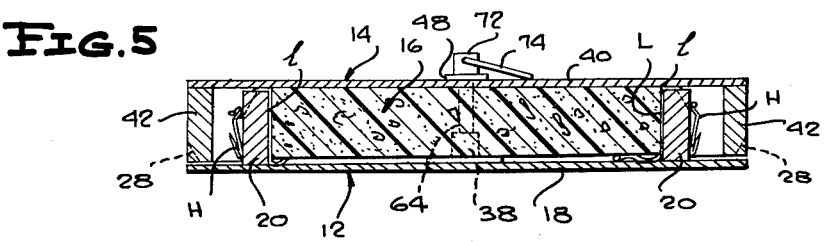
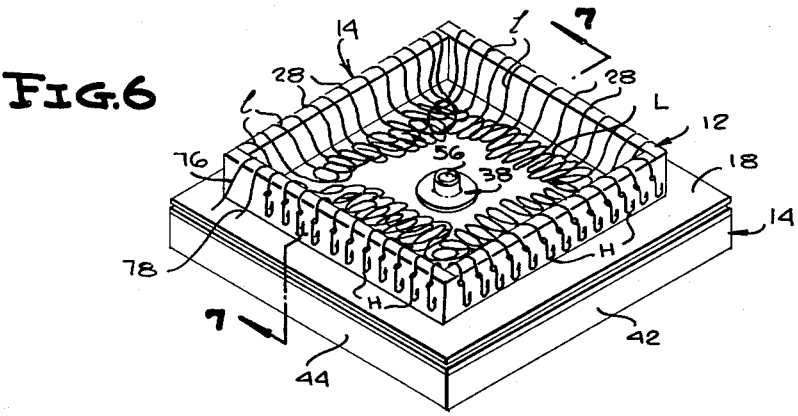
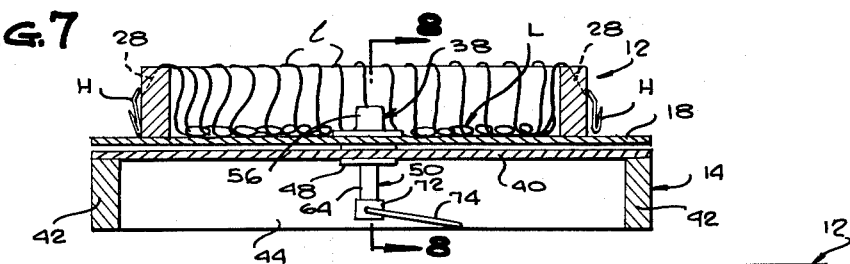
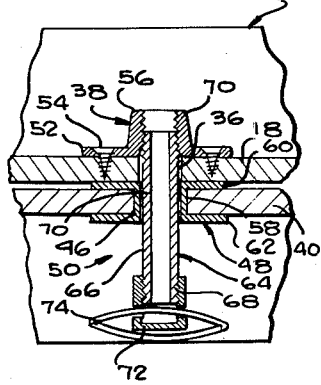
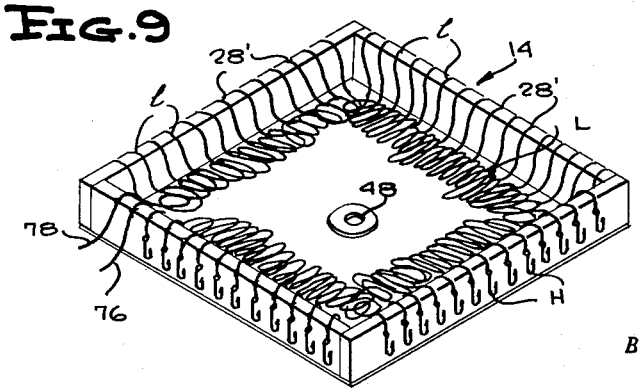
INVENTOR.
PAUL REITZAMMER
BY
McMorrow, Berman & Davidson
ATTORNEYS

United States Patent Office 3,005,281
Patented Oct. 24, 1961

3,005,281
TROT LINE CONTAINER AND DISPENSER
Paul Reitzammer, 317 Pargoud Drive, Monroe, La.
Filed June 10, 1960, Ser. No. 35,200
3 Claims. (Cl. 43—54.5)

This invention relates to trot line handling devices, and more particularly to a novel trot line container and dispensing device.

The primary object of the invention is the provision of a compact, efficient, and easily used device of the kind indicated, which enables:

(1) Setting out a prebaited trot line in a rapid and safe one-pass operation;

(2) Baiting of a trot line in a convenient place, such as under a shade tree, before entering a boat;

(3) Taking in a trot line, after use, quickly and easily and without tangling hooks or the line, to an orderly storage position within the device, in which hooks and the line are positioned for easy visual inspection and any needed replacements;

(4) Holding the trot line for storage and transportation when not in use, and instantly ready for re-use; and, (5) In the event the device is made buoyant, protecting the trot line against loss in the water.

Another object of the invention is to provide a simple device of the character indicated above, which is composed of a small number of simple and easily assembled parts, and which can be made in rugged, serviceable and well-finished forms, at relatively low cost.

Other important objects and advantageous features of the invention will be apparent from the following description and the accompanying drawings, wherein, for purposes of illustration only, a specific form of the invention is set forth in detail.

In the drawings:

FIGURE 1 is a perspective view of a device of the present invention.

FIGURE 2 is an exploded perspective view of said device.

FIGURE 3 is an enlarged fragmentary vertical section taken on the line 3—3 of FIGURE 2.

FIGURE 4 is a fragmentary top plan view taken on the line 4—4 of FIGURE 3.

FIGURE 5 is a vertical transverse section taken on the line 5—5 of FIGURE 1.

FIGURE 6 is a perspective view showing the box of the device inverted and pivotally mounted on the cover for rotation relative thereto, a trot line and its hooks being operatively disposed on the box, in ordered manner.

FIGURE 7 is a transverse vertical section taken on the line 7—7 of FIGURE 6.

FIGURE 8 is an enlarged fragmentary vertical section taken on the line 8—8 of FIGURE 7.

FIGURE 9 is a perspective view of the cover in inverted position and with a recovered trot line and its hooks disposed thereon, in ordered manner.

Referring in detail to the drawings, wherein like numerals designate like parts throughout the several views, the illustrated device, generally designated 10, comprises a flat open top box 12, here shown as being square or rectangular, but which can be circular or oval or any other suitable shape, a conformably contoured pan-shaped cover 14, and a compressible packing block 16. The box 12 and the cover 14 are preferably made of rigid non-corrosive material, such as wood or plastic, and the block 16 can be of such as foam rubber or plastic.

The box 12 comprises a flat bottom wall 18 on which are fixed upstanding sidewalls 20 and end walls 22 which are preferably fixed together at their ends, and which are spaced parallel to and inwardly from the side and end edges 24, 24 and 26, 26, respectively, of the bottom wall 18. The sidewalls and end walls are preferably of the same height and are formed, in their upper edges and their outer sides, at equidistant intervals therealong, with vertical perpendicular slots 28 which have downwardly and outwardly canted bottoms 30 and sides which are composed of parallel inner portions 32 and outwardly flaring outer portions 34. The parallel inner side portions 32 are spaced from each other at distances slightly less than the gauge of leads "$l$" of a trot line L, disposed within the box 12, so that the spaced leads "$l$" are retained frictionally in the slots 28, when engaged therein. The flared slot side portions 34 facilitate placing trot line leads "$l$" in the slots, with the hooks H thereon depending freely along the outer sides of the box walls, with sufficient spaces between adjacent hooks H to enable baiting of hooks without interference from adjacent hooks. The box bottom wall 18 is formed with a central opening 36, surrounded by a metal grommet 38, for a purpose hereinafter described.

The cover 14 comprises a flat top wall 40, of the size and shape of the bottom wall 18 of the box 12, and depending sidewalls 42 and end walls 44, disposed along the edges of the top wall 40, so that when the cover 14 is disposed centrally upon the box 12, as shown in FIGURE 5, the cover walls are equally and parallel spaced outwardly from the box walls, at sufficient distances that the cover walls are out of contact with hooks H on the box walls. The top wall 40 is formed with a central opening 46, provided with a metal grommet 48, to be axially aligned with the box grommet 38.

The lower edges of the cover sidewalls 42 and end walls 44 are formed with slots 28', similar to and arranged like the slots 28 in the box walls, so that, in taking-in a trot line L after use thereof, the trot line leads "$l$" and its hooks H can be securably engaged in the cover slots 28', the cover 14 being supported, in inverted position, as shown in FIGURE 9, and the trot line and the hooks being applied to the cover in reverse order from their application to the box 12 and its slots 28, so that the line and the hooks can be readily transferred, in orderly progression, from the slots 28' of the cover 14 to the slots 28 of the box 12.

For unreeling a trot line which has been applied as described above to the box 12, the box 12 is rotatably mounted upon the cover 14, with the cover 14 in reversed position, as shown in FIGURES 6 and 7, and the cover 14 rested upon a suitable support, such as a boat seat. This mounting is accomplished by means of a pivot assembly 50, and the grommets 38 and 48.

The box grommet 38, as shown in FIGURE 8, comprises an annular flange 52 suitably secured, as indicated at 54, upon the box bottom wall 18, and an upstanding internally threaded upwardly tapered round neck 56 aligned with the opening 36. The cover grommet 48 comprises an unthreaded tubular neck 58 located in the cover top wall opening 46, and annular flanges 60 and 62 which bear upon related sides of the cover top wall 40.

The pivot assembly 50, as shown in FIGURE 8, comprises a preferably tubular removable pivot 64, having a smooth intermediate portion 66, a short threaded end portion 68, and a longer threaded end portion 70, and an internally threaded cap 72, on which is pivoted a loop handle 74. For rotatably mounting the box 12 upon the cover 14, the threaded end portion 70 is threaded into the box grommet 38, its smooth intermediate portion 66 is journaled in the cover grommet 48, and the cap 72 is threaded on the then lower short threaded end portion 68 of the pivot 64. The then upper flange 60 of the cover grommet 48 serves as a bearing and spacer between the box and the cover, and the box 12 is freely rotatable relative to the cover 14, to pay out the trot line L.

For holding the cover 14 down on the bottom wall 18 of the box 12, in the storage relationship of the cover and the box, with the packing block 16 holding the line L and the leads "1" in place, the block 16 has a central opening 17 passing the pivot 64, shown in FIGURES 1 and 5, the pivot 64 is reversed in position, and its longer end portion 70 is threaded down into the neck 56 of the box grommet 38, with its smooth portion 66 located in the neck 58 of the cover grommet 48, with its shorter upper end portion 68 extending above the cover bottom wall 40, and with the cap 72 threaded down on the portion 68.

In use and operation, one end 76 of the trot line L having been tied to a surface anchor, such as a tree in the water, and the outer end 78 secured to the device 10, the intervening part of the line having its leads "1" engaged in successive slots 28 around the walls of the box 12, with the line portions 76 and 78 engaged in adjacent slots 28, the boat is moved in the desired direction away from the tree, so that the leads "1" and their hooks H are pulled successively out of successive slots 28, into the water, until all of the line in or on the box 12 has been peeled off into the water, together with such weights (not shown), as may have been installed on the line. As pull is exerted on the trot line L, as the boat moves away from the anchor, the box 12 is rotated, relative to the cover 14, so that, with respect to each successive slot 28, the line exerts a straight line pull upon each lead "1," so that the related leads of the line arew ithdrawn from the slots with a minimum of friction and wear on the line.

After a fishing operation, the trot line may be placed in the box 12, or if the trot line is trashy, the cover 14 and the box 12 are separated by removing the pivot 64 from the grommet 38, and the cover 14 inverted and placed upon a suitable support, with its slots 28' opening upwardly. Thereupon the leads "1" of the hook equipped part of the trot line L are engaged in successive slots 28', but in reverse order from that in which the line was applied in the slots 28 of the box, and with the hooks H disposed at the outer side of the cover walls, as shown in FIGURE 9. The line and the leads are allowed to dry in the cover 14, for easy cleaning as the line is transferred to the slots 28 of the box 12, in the starting positions thereof. The hooks are always freely available for cleaning and replacement in either the box or the box 14, without disturbing the line to the extent of affecting the operation of the device.

Although there has been shown and described a preferred form of the invention, it is to be understood that the invention is not necessarily confined thereto, and that any change or changes in the strucure of and in the relative arrangements of components thereof are contemplated as being within the scope of the invention as defined by the claims appended hereto.

What is claimed is:

1. A trot line container and dispenser comprising a box having a bottom wall having a peripheral edge, upstanding sidewalls and end walls spaced inwardly from said peripheral edge, said walls having upper edges, there being a plurality of longitudinally spaced vertical slots in the upper edges of the walls, a cover for said box comprising a bottom wall having a peripheral edge and being of the size and shape of the box bottom wall, sidewalls and end walls depending from the cover bottom wall at its peripheral edge and having free lower edges to bear upon the box bottom wall at the peripheral edge thereof, the cover being centered relative to the box with the cover walls spaced outwardly from the box sidewalls, and means separably securing the box and the cover together, said securing means comprising a pivot having a first end secured centrally and removably to the box bottom wall, said cover top wall having a central opening, said pivot having an intermediate portion extending through said opening, said pivot having a second end extending upwardly from the cover top wall, and a cap secured upon said second end of the pivot, said cap being removable from the pivot and the pivot being removable from the box bottom wall, and the cover and box separable from each other, the cover being invertible to rest upon a support and the box being supportable upon the cover top wall, the first end of the pivot being securable to the box bottom wall with its intermediate portion disposed in the opening of the cover top wall, and with the cap engaged on the second end of the pivot beneath the top wall of the cover, the box then being freely rotatable relative to the cover.

2. A trot line container and dispenser comprising a box having a bottom wall having a peripheral edge, upstanding sidewalls and end walls spaced inwardly from said peripheral edge, said walls having upper edges, there being a plurality of longitudinally spaced vertical slots in the upper edges of the walls, a cover for said box comprising a bottom wall having a peripheral edge and being of the size and shape of the box bottom wall, sidewalls and end walls depending from the cover bottom wall at its peripheral edge and having free lower edges to bear upon the box bottom wall at the peripheral edge thereof, the cover being centered relative to the box with the cover walls spaced outwardly from the box sidewalls, and means separably securing the box and the cover together, said securing means comprising a pivot having a first end secured centrally and removably to the box bottom wall, said cover top wall having a central opening, said pivot having an intermediate portion extending through said opening, said pivot having a second end extending upwardly from the cover top wall, and a cap secured upon said second end of the pivot, said cap being removable from the pivot and the pivot being removable from the box bottom wall, and the cover and box separable from each other, the cover being invertible to rest upon a support and the box being supportable upon the cover top wall, the first end of the pivot being securable to the box bottom wall with its intermediate portion disposed in the opening of the cover top wall, and with the cap engaged on the second end of the pivot beneath the top wall of the cover, the box then being freely rotatable relative to the cover, a trot line having a plurality of leads thereon, said leads being disposed in adjacent slots in the box walls, said cover when separated from the box being invertible upon a support, the cover walls having three edges formed with vertical longitudinally spaced lead receiving slots.

3. A trot line container and dispenser comprising a box having a bottom wall having a peripheral edge, upstanding sidewalls and end walls spaced inwardly from said peripheral edge, said walls having upper edges, there being a plurality of longitudinally spaced vertical slots in the upper edges of the walls, a cover for said box comprising a bottom wall having a peripheral edge and being of the size and shape of the box bottom wall, sidewalls and end walls depending from the cover bottom wall at its peripheral edge and having free lower edges to bear upon the box bottom wall at the peripheral edge thereof, the cover being centered relative to the box with the cover walls spaced outwardly from the box sidewalls, and means separably securing the box and cover together, said securing means comprising a pivot having a first end secured centrally and removably to the box bottom wall, said cover top wall having a central opening, said pivot having an intermediate portion extending through said opening, said pivot having a second end extending upwardly from the cover top wall, and a cap secured upon said second end of the pivot, said cap being removable from the pivot and the pivot being removable from the box bottom wall, and the cover and box separable from each other, the cover being invertible to rest upon a support and the box being supportable upon the cover top wall, the first end of the pivot being securable to the box bottom wall with its intermediate portion disposed in the opening of the cover top wall, and with the cap engaged on the second end of the pivot beneath the top wall of the cover, the box then being freely rotatable relative to the cover, said box bottom wall having a central opening, a box grommet surrounding said central opening comprising an annular flange secured upon the box bottom wall and an upstanding internally threaded neck in which the first end of the pivot is threadable, a cover grommet surrounding the opening of the cover top wall, said cover grommet comprising a tubular neck disposed in the cover top wall opening and first and second annular flanges engaged with opposite sides of the cover top wall, the intermediate portion of the pivot being journaled in said cover grommet neck.

References Cited in the file of this patent

UNITED STATES PATENTS

| | | |
|---|---|---|
| 2,599,113 | Latta et al. | June 3, 1952 |
| 2,680,929 | Work | June 15, 1954 |
| 2,901,858 | Pinkerton et al. | Sept. 1, 1959 |

FOREIGN PATENTS

| | | |
|---|---|---|
| 43,015 | Sweden | July 2, 1915 |